Dec. 2, 1924.  1,517,607

C. F. WIESENMEYER

AUTOMOBILE TIRE CHAIN FASTENER

Filed Jan. 19, 1924

Witnesses:
1. Helen M? Call
2. Glenn Durham

Charles F. Wiesenmeyer,
INVENTOR.

BY A.B. M? Call,
ATTORNEY

Patented Dec. 2, 1924.

1,517,607

UNITED STATES PATENT OFFICE.

CHARLES F. WIESENMEYER, OF SPRINGFIELD, ILLINOIS.

AUTOMOBILE TIRE-CHAIN FASTENER.

Application filed January 19, 1924. Serial No. 687,286.

*To all whom it may concern:*

Be it known that I, CHARLES F. WIESENMEYER, a citizen of the United States, residing at Springfield, in the county of Sangamon and State of Illinois, have invented certain new and useful Improvements in Automobile Tire-Chain Fasteners, of which the following is a specification.

This invention is of the class of devices such as are commonly used for fastening tire chains on automobile tires, and this device in particular is adapted to provide a very simple and very convenient means for accomplishing this purpose.

The desired object of my invention is attained by the automobile tire chain fastener, described in the annexed specification, recited in the claims and illustrated in the accompanying drawings, in which like reference numerals indicate the same structural parts in the several figures.

I now refer to the several figures explaining in each case what is represented thereby.

The preferred embodiment of my invention is illustrated in the several figures above mentioned and the desired means of operating this device will be clearly understood by carefully observing the figures together with the instructions which follow for operating the tire chain fastener of my invention.

Referring now to the several elements of my invention shown in the respective figures I shall attempt to point out the relation of these elements to the whole structure and the means of operating the device when in normal use. It will be observed in this connection that each of the elements of the invention as well as related elements not in the invention, are indicated for reference purposes by numerals.

Numeral 1 represents the looped tongue element which is made in combination with circular ring 2 to form the chain fastening means of my invention.

In the manufacture of this device, ring 2 is made on the same principle as other chain links are made, while tongue element 1 cannot be completed in its finished design until it has been formed at one end into an engaging loop which simultaneously engages ring 2, and a chain link 6 which represents one end of the tire chain and terminates in a second loop 4 which engages the neck of the first loop.

Figure 2:
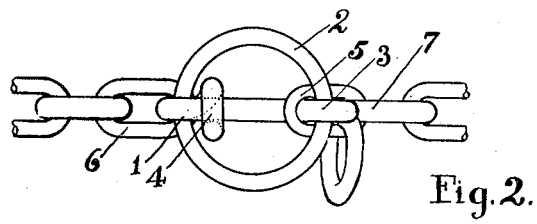
Fig. 2 is a plan or top view of the device of my invention shown in its normally locked position secured to the tire chain links.
Figure 1:
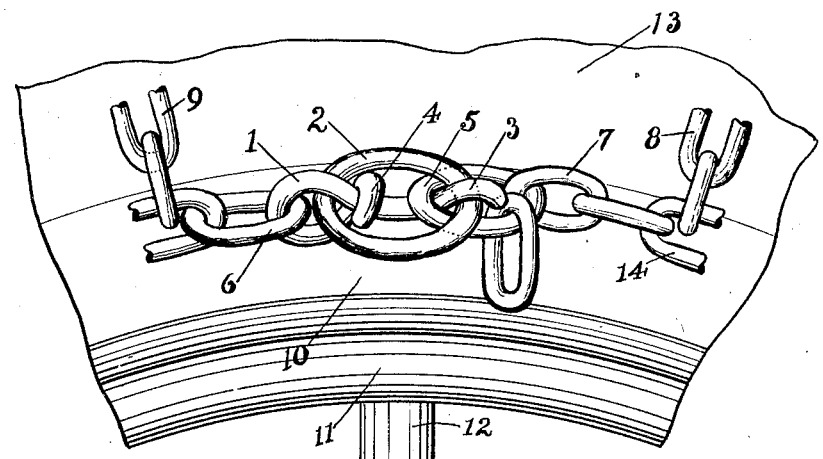
Fig. 1 is a perspective of a section of a tire chain including therein the chain fastening device of my invention shown as it would appear when in normally locked position.

The extended portion of tongue element 1 is designed to sway slightly in the middle portion of its length and shaped into a slight hook at its loose end, in which form it is adapted to operate something in the nature of a belt buckle or harness buckle in which capacity tongue element 1 is adapted to serve as stop means for link 5 of the chain as is shown in Fig. 1.

Figure 3:
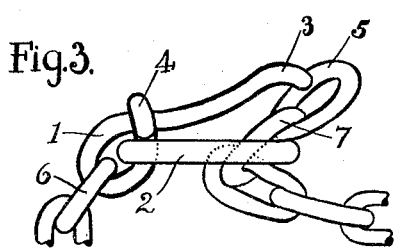
Fig. 3 is a perspective of the device of my invention shown in opened position as it would commonly be when the two opposite ends of the tire chain are about to be securely united by it.

It will be observed in Fig. 3 that when it is desired to securely fasten the chain after mounting it on the tire the fastening device is opened to a position where link 5 is slipped through the ring and made to engage the loose end of tongue element 1. After link 5 engages tongue element 1 the hand hold is released and the tension of the chain pulls the extended loose end of the tongue element down against the rim in which position said tongue element serves as lock means for holding the chain as it will be clearly observed in Fig. 1.

One of the particular merits of the device of my invention is illustrated by numeral 3 and is a slight curve in the loose end of the tongue element of the chain fastener, which curve is designed to prevent link 5 from slipping off the loose end of tongue element 1 in the event of a jar of the wheel causing a relaxation in the tension of the circular chain.

Numeral 7 represents other chain links of the chain. Numeral 8 represents one of the chain links that is adapted to pass over the top of the tire. Numeral 9 represents a link serving the same purpose in a different position on the tire. Numeral 10 represents the rim of the wheel. Numeral 11 represents the wheel felloe to which the rim is attached. Numeral 12 represents the spoke of the wheel. Numeral 13 represents the tire. Numeral 14 a link in the circular chain.

It is obvious that with the design of my invention herein described it could be very easily and economically manufactured, and the particular merit of the device is not alone in its economy of manufacture but also in the simplicity of operation, as well as the security with which it holds the tire chain into operative position.

Having thus described the nature of my invention, what I claim as new and useful and desire to secure by Letters Patent is:

In a tire chain fastener having a circular ring and a loop-attached tongue element normally positioned across the diameter of the ring, the combination of a circular ring with a looped tongue means provided at the hinged end with integral loop adapted to simultaneously engage the periphery of said ring and an end link of an automobile tire chain; said tongue element provided near the loose end with a slight dip followed by an upward and arched bend forming an integral hook adapted to normally rest on the periphery of said ring opposite the resting point of said integral loop-attached tongue element; and thus normally adapted to serve as a means of securely uniting automobile tire chain ends substantially and prevent accidental disengagement of said automobile tire chain when in normal use, in the manner described and for the purpose set forth.

In witness whereof, I hereunto set my hand and seal, this 9th day of January, A. D. 1924.

CHARLES F. WIESENMEYER. [L. S.]

Witnesses:
 LOUIS F. WIESENMEYER,
 JOHN G. DIRKSEN.